United States Patent [19]

Wyckoff

[11] 4,456,211
[45] Jun. 26, 1984

[54] SHELF BRACKET RETAINER

[75] Inventor: Stephen G. Wyckoff, Mount Prospect, Ill.

[73] Assignee: Illinois Tool Works Inc., Chicago, Ill.

[21] Appl. No.: 298,031

[22] Filed: Aug. 31, 1981

[51] Int. Cl.³ .................................. F16M 13/00
[52] U.S. Cl. ................................ 248/544; 248/235; 248/309.2; 403/252; 403/316
[58] Field of Search .......... 248/544, 222.1, 243, 248/246, 250, 235, 221.3, 221.4, 309 A; 211/192; 403/252, 254, 316

[56] References Cited

U.S. PATENT DOCUMENTS

| | | | |
|---|---|---|---|
| 1,915,479 | 6/1933 | Smith | 248/222.1 |
| 3,652,032 | 3/1972 | Eros et al. | 248/235 |
| 4,335,861 | 6/1982 | Klaric | 248/222.1 |
| 4,382,710 | 5/1983 | Slowbe | 403/252 |

Primary Examiner—William H. Schultz
Assistant Examiner—Ramon O. Ramirez
Attorney, Agent, or Firm—Thomas W. Buckman; John P. O'Brien

[57] ABSTRACT

A single piece plastic retainer is provided for holding refrigerator shelves in place during shipment. The retainer is open sided, and has upper and lower walls with notches for snapping into place in an aperture in a mounting channel in which the shelf bracket is mounted and in overlying relation to said bracket. Protuberances within the shelf retainer engage the top edge of the shelf bracket to prevent cutting of the retainer by the bracket in the presence of high stresses.

7 Claims, 5 Drawing Figures

U.S. Patent    Jun. 26, 1984    4,456,211
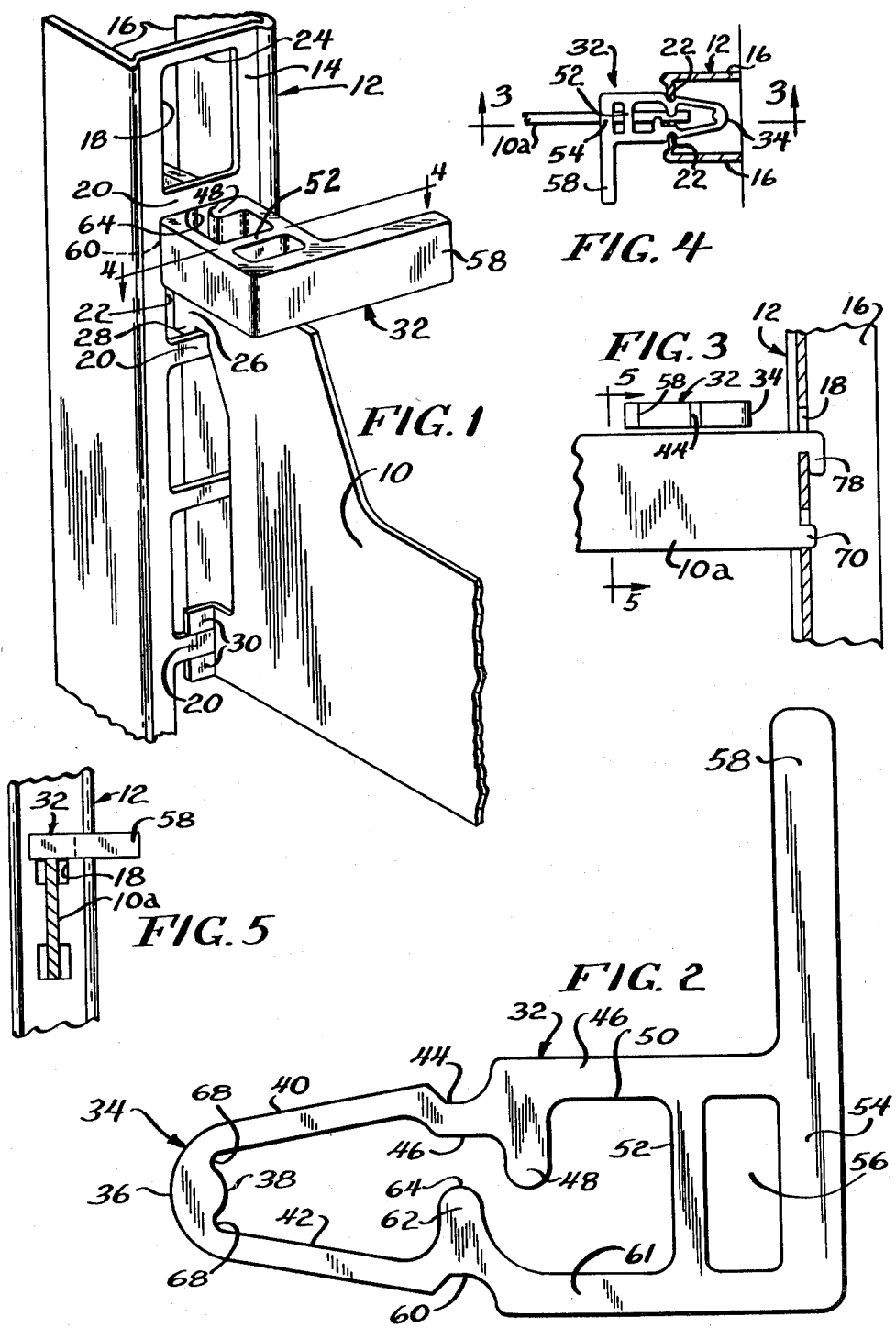

SHELF BRACKET RETAINER

BACKGROUND OF THE INVENTION

In modern refrigerators, it is common practice to provide vertical runners or channels having openings in the inwardly facing webs thereof into which metal or sometimes plastic brackets are inserted for supporting shelves in the refrigerator. Such brackets commonly extend into such apertures in the channel webs and latch behind the material of the webs adjacent the apertures. The weight of the shelves and articles thereon serves to hold the brackets firmly in place. However, in shipping, either from the factory to a retail outlet, or from the retail outlet to a customer's home, the refrigerator may be subject to many forces other than the static force of gravity. Refrigerators may be tipped on one side for movement, and they may receive severe jostling in many directions in delivery trucks.

This provides an opportunity for brackets to work loose, as undesirable situation from the purchaser's standpoint. Furthermore, it is possible that this would permit brackets to fall out, or shelves to rattle around, producing undesirable damage or marks to the interior surface of the refrigerator.

OBJECTS AND BRIEF DESCRIPTION OF THE ILLUSTRATIVE EMBODIMENT

It is an object of the present invention to provide a retainer for a refrigerator shelf bracket to hold the bracket in place with retaining portions of the bracket secured within apertures in a vertical runner or channel.

A further object of the present invention is to provide a retainer for a refrigerator shelf bracket comprising a one-piece plastic member adapted to wedge between a portion of a shelf bracket and the edge of an aperture in a supporting vertical runner or channel to hold the bracket in place during shipment.

It is yet another object to provide a bracket retainer as just described having structure therein to prevent the bracket from cutting into the retainer under severe forces.

In carrying out the foregoing objects, a shelf retainer is provided which comprises a one-piece plastic article. This piece can be individually molded, or a long section may be formed at one time and severed into discrete retainers. The retainer has a closed nose or entering portion reinforced in such manner as to provide a desired flexing upon movement of the retainer to retaining position. Inwardly directed walls and protuberances are provided to prevent the bracket from cutting into the retainer in response to unusually high forces. The retainer is provided with external recesses for receiving edge portions of the supporting runners or channels. A finger piece is provided on the shelf retainer for ready manual handling.

THE DRAWINGS

The invention will best be understood with reference to the following specification when taken in connection with the accompanying drawings wherein:

FIG. 1 is a perspective view of a shelf bracket retainer constructed in accordance with the present invention in combination with relevant parts;

FIG. 2 is a side view of the retainer;

FIG. 3 is a vertical sectional view on a reduced scale through the channel or runner showing a bracket in place with a retainer about to be installed taken along the line 3—3 in FIG. 4;

FIG. 4 is a horizontal sectional view substantially along the line 4—4 in FIG. 1; and FIG. 5 is a vertical sectional view along the line 5—5 in FIG. 3.

DETAILED DESCRIPTION OF THE ILLUSTRATIVE EMBODIMENT

Referring first to FIG. 1 the environment of the present invention will be seen to include a shelf bracket 10 for use in a refrigerator, and being of generally well known construction. The bracket is mounted by interfitting with a vertical runner 12 in the form of a channel having bight or web 14 with side flanges 16. The web 14 is provided with a series of vertically spaced rectangular apertures 18 having cross members 20 arranged somewhat as the rungs of a ladder. The apertures 18 have side edge portions 22 spaced laterally from one another and lying in a common plane.

The particular bracket structure is not a part of the present invention and may vary rather considerably. In the illustrative embodiment of FIG. 1 there is an upward projection 26 having a downwardly directed hook portion 28 and a lateral portion forming an upwardly directed edge (not shown) lying substantially in the plane of the web 14. The hook portion fits in above a cross member 20, and then is lowered into place behind this cross member. At the lower corner of the shelf bracket 10 below the hook portion at 28 there are two deflected ears 30 designed to span a cross member 20 to retain the shelf bracket 10 against upward movement which could allow the hook 28 to be moved out from behind the corresponding cross member 20. This does not happen in normal use since the weight of the shelf and items on the shelf supported by the shelf bracket 10 holds the shelf bracket firmly in position. As will be appreciated, a generally clockwise torque (as viewed in FIG. 1) is provided on the shelf bracket due to the weight thereon, thereby holding the ears 30 in position spanning the appropriate cross member 20, and pulling the hook 28 against the back surface of the higher cross member 20. Such normal conditions prevail throughout most of the life span of the refrigerator, but during shipment there may be forces in various other directions that could tend to move the shelf bracket up from its installed position, thereby permitting it to fall from place, and permitting the shelf supported thereby to fall with it. This could cause damage of various sorts to the interior of the refrigerator.

To prevent such undesired movement of the shelf bracket 10, I have provided a shelf bracket retainer 32. This shelf bracket retainer includes an entering nose portion 34 which has a rounded outer surface 36 with an inner rounded surface 38 of different radius, and serving reinforce the nose portion and to control the flexing relative thereto of upper 40 and lower 42 diverging walls (in the position shown in FIG. 2).

The upper wall 40 has a shallow slope upwardly and to the right away from the entering nose portion 34, and leads to a transverse indentation or slot 44, continuing therefrom as a horizontal wall portion 46. On the inside of the upper wall portion 40, 46 and below the indentation or slot 44 there is a dropped surface 46 providing a generally instant wall thickness leading to a depending projection 48. The lower portion of the top wall continues horizontally at 50 from the projection 48 to a transverse reinforcing wall 52 and a wall 54 of greater thickness, leaving a vertically rectangular cavity 56 beneath the wall 46 and between the walls 52 and 54. A gripping tab 58 forms an upward projection from the in wall 54 for handling of the retainer between an operator's thumb and forefinger with the thumb readily positioned to press against the rear wall 54.

The lower wall 42 extends downwardly to the right at a shallow angle, the walls 40 and 42 being symmetrical about a horizontal surface. The downwardly sloping wall 42 leads to a downwardly opening slot or recess 60 aligned with the upper corresponding slot or recess 44, and leads to a horizontal wall portion 61 which crosses to the intermediate wall 52 and terminates at an integral connection with the rear vertical wall 54. The lower or bottom wall 42, 61 is provided with an upward projection 62 above the slot or recess 60 and aligned with the horizontal surface 46. A generally uniform wall thickness is maintained.

It will be apparent that the upper tab 58 allows an operator or installer readily to grip the retainer between his thumb and forefinger with the thumb extending somewhat beyond the forefinger, whereby to push the retainer into place as shown in FIG. 1 with the tab extending to the right.

In the installed position of the retainer as seen in FIG. 1, the recess or slot 44 receives the right edge 22 of the corresponding aperture 18, while the slot or recess 60 receives the left edge 22 of the aperture. This holds the retainer in place so that it cannot be accidentally displaced, the edges received in the slots 44 and 60 preferably maintaining pressure on the bottoms of the respective slots to hold the retainer under some degree of compression. Thus, the retainer prevents the shelf bracket from coming loose during shipment, and the retainers are sufficiently inconspicuous that they may simply be left in place upon delivery to the eventual owner.

As best may be seen in FIG. 1, the retainer is open on top and bottom, thereby allowing flexing of the walls as previously discussed. It will also be observed (in FIG. 2) that there are reversely curved portions 68 joining the enlarged portion 38 to the adjacent top and bottom walls 40 and 42, thus promoting the desired resilient flexibility of the retainer. Various resilient plastic materials are suitable for manufacture of the retainer, and nylon is mentioned as one satisfactory example. It should be noted that in certain application, the top and bottom walls 40 and 42 need not be joined by the outer rounded surface or include the enlarged portion 38 on the inner surface. By so contructing, i.e., a bifurcated nose portion, the resiliency and flexibility of the top and bottom walls 40 and 42 will be modified to permit the retainer to be more easily inserted and removed from the aperture 18.

Further insight into the invention will be attained with reference to FIGS. 3–5. A somewhat simplified shelf bracket is seen at 10a having a top extending position 78 which fits in the upper of two adjacent apertures 18. A simple, flat projection 70 is received in the next lower aperture 18.

The retainer 32 is manually installed by moving it endwise from the position of FIG. 3 to the position of FIG. 4. The end wall 54, the intermediate wall 52, and both protuberances 48 and 62 engage the top of the bracket 10a. The top edge of the bracket is relatively thin sheet metal, and the several areas of contact provided by the retainer prevent the bracket edge from cutting into the retainer. Such cutting, if permitted, could render the retainer ineffective.

The specific example of the invention as herein shown and described is for illustrative purposes only. Various changes in structure may occur to those skilled in the art, and will be understood as forming a part of the present invention insofar as they fall within the spirit and scope of the appended claims.

The invention is claimed as follows:

1. A shelf bracket retainer of unitary resilient plastic construction comprising an entering nose portion having diverging top and bottom walls, each of said walls having an exterior indentation for receiving confronting edges of a shelf bracket, at least one of said walls having an inwardly directed protuberance opposite to the corresponding indentation and providing a surface for engagement for engaging the edge of a shelf bracket.

2. A retainer as set forth in claim 1 wherein both of said walls have by directed protuberances offset from one another and providing two surfaces for engagement with the edge of a shelf support.

3. A retainer as set forth in claim 1 and further including a finger-gripping tab on the opposite end of said retainer from said nose portion.

4. A retainer as set forth in claim 2 and further including a finger-gripping tab on the opposite end of said retainer from said nose portion.

5. A retainer as set forth in claim 1 wherein said entering nose portion has a rounded exterior surface and an inner enlargement.

6. A retainer as set forth in claim 5 wherein said inner enlargement comprises a rounded enlargement curved oppositely to the rounded outer surface of the nose portion.

7. A retainer as set forth in claim 6 wherein said inner rounded enlargement joins the diverging walls with curved portions oppositely directed relative to said inner enlargement.

* * * * *